US012012097B2

(12) United States Patent
Vandapel et al.

(10) Patent No.: US 12,012,097 B2
(45) Date of Patent: Jun. 18, 2024

(54) COMPLEMENTARY CONTROL SYSTEM FOR AN AUTONOMOUS VEHICLE

(71) Applicant: FORD GLOBAL TECHNOLOGIES, LLC, Dearborn, MI (US)

(72) Inventors: Nicolas Vandapel, Pittsburgh, PA (US); Shadi A. Jammoul, Northville, MI (US); Russell Schloss, Pittsburgh, PA (US); Basel Alghanem, Pittsburgh, PA (US); Benjamin D. Ballard, Sewickley, PA (US); Yujun Wang, Mountain View, CA (US); Limin Wu, Campbell, CA (US)

(73) Assignee: Ford Global Technologies, LLC, Dearborn, MI (US)

( * ) Notice: Subject to any disclaimer, the term of this patent is extended or adjusted under 35 U.S.C. 154(b) by 189 days.

(21) Appl. No.: 17/389,121

(22) Filed: Jul. 29, 2021

(65) Prior Publication Data

US 2023/0033297 A1    Feb. 2, 2023

(51) Int. Cl.
*B60W 30/095* (2012.01)
*B60W 30/18* (2012.01)
*B60W 60/00* (2020.01)

(52) U.S. Cl.
CPC .... *B60W 30/095* (2013.01); *B60W 30/18109* (2013.01); *B60W 60/001* (2020.02)

(58) Field of Classification Search
CPC ......... B60W 30/095; B60W 30/18109; B60W 60/001
See application file for complete search history.

(56) References Cited

U.S. PATENT DOCUMENTS

| 7,630,807 | B2 | 12/2009 | Yoshimura et al. |
| 8,762,006 | B2 | 6/2014 | Miller |
| 9,368,026 | B1 | 6/2016 | Herbach et al. |
| 9,542,846 | B2 | 1/2017 | Zeng et al. |
| 9,604,585 | B2 | 3/2017 | Joyce et al. |
| 9,740,178 | B2 | 8/2017 | Debouk et al. |
| 9,862,364 | B2 | 1/2018 | Fairfield |
| 10,061,313 | B2 | 8/2018 | Letwin et al. |
| 2018/0373263 | A1 | 12/2018 | Gray |

(Continued)

OTHER PUBLICATIONS

International Search Report issued in PCT/US2022/074196 dated Sep. 29, 2022.

(Continued)

*Primary Examiner* — Abby Y Lin
*Assistant Examiner* — Danielle M Jackson
(74) *Attorney, Agent, or Firm* — Frank A. MacKenzie; Brooks Kushman P.C.

(57) ABSTRACT

Systems and methods for complementary control of an autonomous vehicle (AV) are disclosed. The methods include receiving information comprising an active trajectory of an AV that the AV intends to following for a planning horizon. The methods also include using the active trajectory to identify one or more regions in an environment of the AV such as a fallback monitoring region (FMR) and an active monitoring region (AMR), and generating one or more instructions for causing the AV to execute a collision mitigation action in response to an object being detected within the AMR. The methods further include transmitting the one or more instructions to an AV platform (AVP) for execution.

16 Claims, 7 Drawing Sheets

(56) References Cited

U.S. PATENT DOCUMENTS

| | | | |
|---|---|---|---|
| 2019/0161274 A1* | 5/2019 | Paschall, II | G05D 1/0246 |
| 2020/0148201 A1 | 5/2020 | King et al. | |
| 2021/0009112 A1* | 1/2021 | Alzaydi | B60T 7/22 |
| 2021/0094589 A1 | 4/2021 | Sarett et al. | |
| 2021/0171062 A1* | 6/2021 | Hecker | B60T 8/885 |
| 2021/0284108 A1* | 9/2021 | Liu | B60T 7/22 |
| 2021/0394749 A1* | 12/2021 | Horigome | G08G 1/167 |
| 2022/0185330 A1* | 6/2022 | Boydston | B60W 30/18154 |
| 2023/0015466 A1* | 1/2023 | Jiralerspong | G08G 1/166 |

OTHER PUBLICATIONS

U.S. Appl. No. 17/389,136, filed Jul. 20, 2021, Complementary Control System for an Autonomous Vehicle.
International Preliminary Report on Patentability dated Feb. 8, 2024 for PCT Appn. No. PCT/US2022/074196 filed Jul. 27, 2022, 8 pgs.

\* cited by examiner

COMPLEMENTARY CONTROL SYSTEM FOR AN AUTONOMOUS VEHICLE

BACKGROUND

Autonomous vehicles (AV) are either developed to navigate and operate unmanned vehicles or to assist a vehicle operator, and can utilize many different types of sensors, automation, robotics, and other computer-controlled systems and mechanisms. Under existing technology, AVs can readily handle driving with other vehicles on roadways such as highways.

Safety is a concern of paramount importance greatly affecting the development and widespread adoption of AVs. This includes the safety of passengers and cargo within an AV, the safety of passengers and cargo in other vehicles (autonomous and human-controlled), pedestrians, property, and so forth. Even with today's advanced computing systems, errors can occur due to failure of one or more control units within the AV architecture.

Some AV systems employ one or more identical redundant controller systems that execute the same functions such that in case of failure of one controller, a redundant controller can take control. However, such redundancies in hardware and software for control systems result in increased system complexity, increased energy usage, increased vehicle weight, and cost inefficiencies.

This document describes methods and systems that are directed to addressing the problems described above, and/or other issues.

SUMMARY

In various scenarios, systems and methods for complementary control of an autonomous vehicle are disclosed. The methods may be executed by a complementary controller, and may include receiving information comprising an active trajectory of an AV from a primary controller where the active trajectory is a path that the AV intends to following for a planning horizon. The methods also include using the active trajectory for identifying one or more regions in an environment of the AV such as, for example a fallback monitoring region (FMR), and an active monitoring region (AMR). The methods further include generating one or more instructions for causing the AV to execute a collision mitigation action in response to an object being detected within the AMR, and transmitting the one or more instructions to an AV platform (AVP) for execution.

In some implementations, the methods may include, by a primary controller, receiving a first set of sensor data from a primary sensor system and a second set of sensor data from the secondary sensor system, generating the active trajectory based on the first set of sensor data and the second set of sensor data, and transmitting primary navigation instructions for navigating the AV along the active trajectory for transmission to the AVP to the complementary controller. Optionally, the complementary controller may receive the primary navigation instructions for transmission to the AVP, and stop transmission of the received primary navigation instructions to the AVP while transmitting the one or more instructions to the AVP. In various embodiments, the complementary controller may generate the one or more instructions for causing the AV to execute the collision mitigation action upon determining that the navigation instructions include a deceleration instruction that is greater than a maximum allowed deceleration.

In some other implementations, the complementary controller may generate the one or more instructions only in response to determining that a risk of collision with the object is greater than a threshold. The risk of collision may be determined based on, for example, a state of the object, a state of the AV, environmental conditions, sensing pipeline performance, and/or detection pipeline performance.

Optionally, the collision mitigation action may include causing the AV to come to a stop using a maximum allowed deceleration.

In certain implementations, the complementary controller may generate the one or more instructions for causing the AV to execute the collision mitigation action only if an instruction for executing a minimum risk collision (MRC) state has been received by the complementary controller when a second object is detected to be present within an area of the FMR that does not include the AMR.

Optionally, the instruction for executing the MRC state may be received from a primary controller upon detection of an error in one or more functions of the primary controller.

In some other implementations, the complementary controller may stop transmission of the one or more instructions to the AVP in response to determining an error within the complementary controller. The error may include, for example, a pose determination error, a sensor error, a sensor communication error, a primary controller communication error, or a perception error.

In some scenarios, a computer program product is disclosed. The computer program product may include a memory and programming instructions that are configured to cause a processor to receive information including an active trajectory of an AV from a primary controller where the active trajectory is a path that the AV intends to following for a planning horizon. The processor may use the active trajectory to identify one or more regions in an environment of the AV such as, for example a fallback monitoring region (FMR), and an active monitoring region (AMR). The processor may then generate one or more instructions for causing the AV to execute a collision mitigation action if an object is present within the AMR, and transmit the one or more instructions to an AV platform (AVP) for execution.

In some other scenarios, systems and methods for complementary control of an autonomous vehicle are disclosed. The methods may be executed by a complementary controller, and may include detecting a triggering event, and causing an AV platform to initiate a failover stop action to bring the AV to a stop along an active trajectory upon detecting the triggering event. The triggering event may include, for example, receipt of instructions from the primary controller for executing a minimum risk condition (MRC) state of the AV, an error associated with a communication between various subsystems of the AV, etc.

Optionally, the active trajectory may be a trajectory received from the primary controller within a threshold time before detection of the triggering event.

Optionally, the failover stop action may include bringing the AV to a stop along the active trajectory without application of a maximum allowed deceleration. Additionally and/or alternatively, the failover stop action may include bringing the AV to a stop along the active trajectory by application of a maximum allowed deceleration upon detection of an object within a fallback monitoring region along the active trajectory.

Optionally, the error associated with the message may include, for example, errors in communications between the primary controller and the complementary controller and/or errors in communications between one or more sensors and the complementary controller.

In some implementations, the complementary controller may receive the instructions for executing the MRC state from the primary controller upon detection of an error in one or more functions of the primary controller.

The complementary controller may also stop provision of a first plurality of instructions, received from the primary controller, to the AV platform upon detection of the triggering event.

In some scenarios, a computer program product is disclosed. The computer program product may include a memory and programming instructions that are configured to cause a processor to detect a triggering event, and cause an AV platform to initiate a failover stop action to bring the AV to a stop along an active trajectory upon detecting the triggering event. The triggering event may include, for example, receipt of instructions from the primary controller for executing a minimum risk condition (MRC) state of the AV, an error associated with a communication between one or more subsystems of the AV, etc.

DETAILED DESCRIPTION

As used in this document, the singular forms "a," "an," and "the" include plural references unless the context clearly dictates otherwise. Unless defined otherwise, all technical and scientific terms used herein have the same meanings as commonly understood by one of ordinary skill in the art. As used in this document, the term "comprising" means "including, but not limited to." Definitions for additional terms that are relevant to this document are included at the end of this Detailed Description.

The following disclosure describes a primary controller for controlling the operations of an AV under normal operating conditions. The disclosure further describes a complementary controller that is configured to take over guidance of the AV from the primary controller and control the operations of the AV itself to perform collision mitigation and/or upon occurrence of a failure or other triggering event (as described below), without immediate intervention from a human driver.

Figure 1:
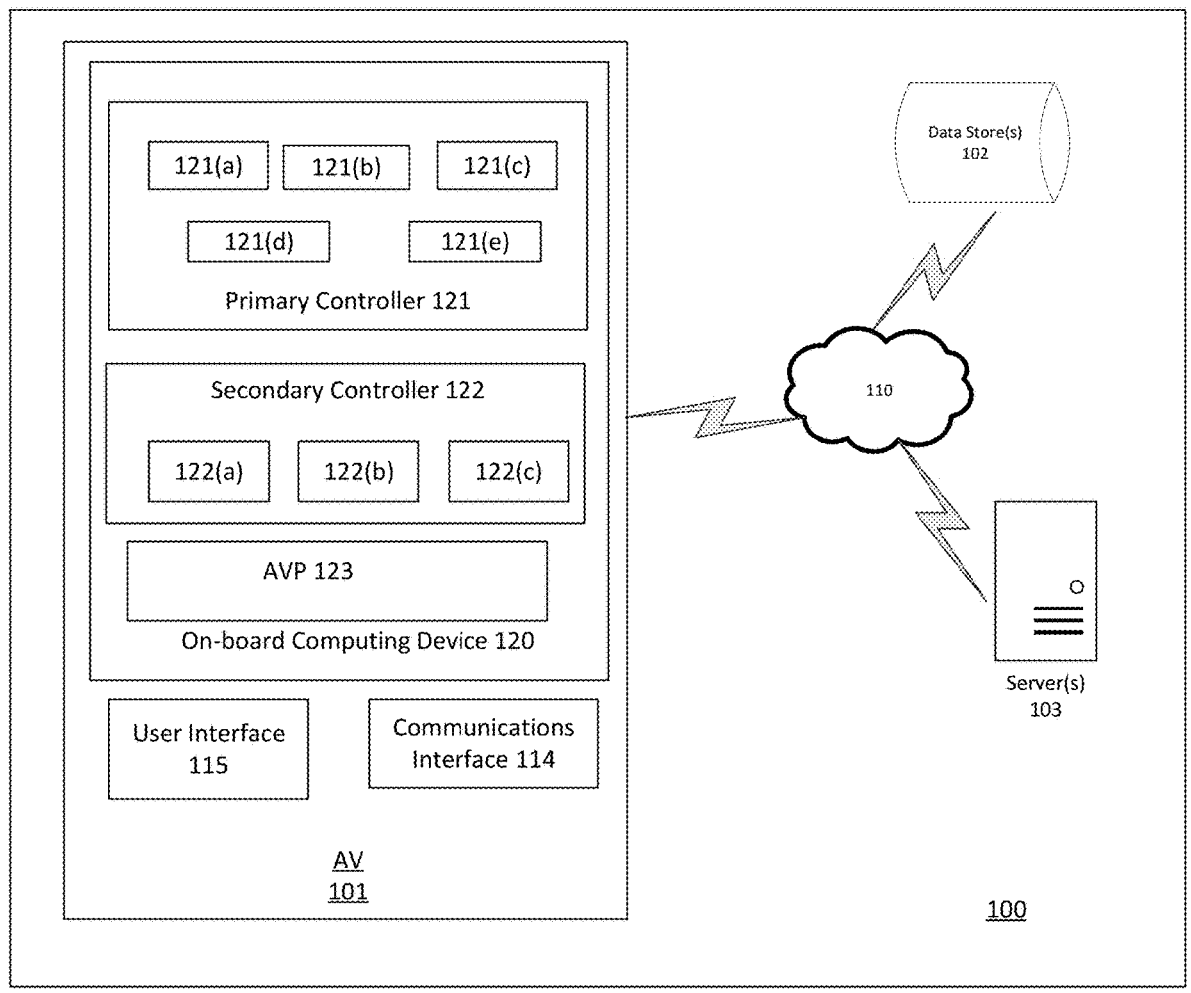
FIG. 1 illustrates an example system that includes an autonomous vehicle.

Before describing the details of the complementary control system, it is useful to provide some background information about autonomous vehicle (AV) systems. FIG. 1 is a block diagram illustrating an example system 100 that includes an AV 101 in communication with one or more data stores 102 and/or one or more servers 103 via a network 110. Although there is one AV shown, multiple AVs may be coupled to each other and/or coupled to data stores 102 and/or servers 103 over network 110. Network 110 may be any type of network such as a local area network (LAN), a wide area network (WAN) such as the Internet, a cellular network, a satellite network, or a combination thereof, and may be wired or wireless. Data store(s) 102 may be any kind of data store such as, without limitation, map data store(s), traffic information data store(s), user information data store(s), point of interest data store(s), or any other type of content data store(s). Server(s) 103 may be any kind of servers or a cluster of servers, such as, without limitation, Web or cloud servers, application servers, backend servers, or a combination thereof. The server 103 is an external electronic device that is in communication with the AV's on-board computing system 110, either via a wireless connection while the vehicle is making a run, or via a wired or wireless connection while the vehicle is parked at a docking facility or service facility. The server 103 may receive data that the AV collected during its run, such as perception data and operational data. The server 103 also may transfer data to the AV such as software updates, high definition (HD) map updates, machine learning model updates and other information. Specific components within such systems will be described in the discussion of FIG. 7 later in this document.

Certain components or subsystems of the AV 101 may be embodied in processor hardware and computer-readable programming instructions that are part of the AV's on-board computing system 110. The subsystems may include a primary controller 121, a complementary controller 122, and AV platform (AVP) 123. The primary controller 121 and/or the complementary controller 122 may transmit control instructions to the AVP 123 for controlling navigation of the AV in an autonomous mode. The AVP 123 may navigate the AV in accordance with the received instructions to, for example, control braking via a brake controller; direction via a steering controller; speed and acceleration via a throttle controller (in a gas-powered vehicle) or a motor speed controller (such as a current level controller in an electric vehicle); a differential gear controller (in vehicles with transmissions); and/or other controllers. Some or all of these components may be controlled by the AVP 123 using a variety of communication signals and/or commands, such as, for example, acceleration signals or commands, deceleration signals or commands, steering signals or commands, braking signals or commands, etc.

In certain embodiments, the primary controller 121 may provide at least some of the instructions to the AVP 123 for execution, via the complementary controller 122. Examples of such instructions may include, without limitation, motion and planning commands (e.g., torque, steering, gear position, etc.), external communications with road users (e.g., turn signals, horn, hazards, etc.), headlamp commands, status information (i.e., information relating to the current performance of the AV), mode information (i.e., whether the AV is operating in an autonomous mode, semi-autonomous mode, or in a user controlled mode), or the like. The complementary controller 122 may make decision relating to whether or not to pass on the primary controller commands 121 to the AVP 123 depending upon a state of the AV, the AVP, the primary controller and/or the complementary controller (as discussed below).

The primary controller 121 includes a primary perception system 121(a) that includes primary sensors that capture information about moving actors and other objects that exist in the vehicle's immediate surroundings. The complementary controller 122 also includes a secondary perception system 122(a) that includes secondary sensors that capture information about moving actors and other objects that exist in at least part of the vehicle's immediate surroundings (a perception region, discussed below). Examples of such sensors include, without limitation, a LiDAR system, a radio detection and ranging (RADAR) system, a laser detection and ranging (LADAR) system, a sound navigation and ranging (SONAR) system, one or more cameras (e.g., visible spectrum cameras, infrared cameras, etc.), temperature sensors, position sensors (e.g., global positioning system (GPS), etc.), location sensors, fuel sensors, motion sensors (e.g., inertial measurement units (IMU), inertial timing modules (ITM), etc.), humidity sensors, occupancy sensors, or the like. The data captured by the primary sensors (such as digital image, LiDAR point cloud data, or radar data) is known as primary perception data, and the data captured by the secondary sensors (such as digital image, LiDAR point cloud data, or radar data) is known as secondary perception data. In various embodiments, the primary controller 121 may receive the secondary perception data from the complementary controller 122. During deployment of the AV, the AV receives primary and/or secondary perception data from one or more sensors of the AV's perception system. The perception data may include data representative of one or more objects in the environment.

The primary perception system 121(a) may include one or more processors, and computer-readable memory with programming instructions and/or trained artificial intelligence models that, during a run of the AV, will process the primary and/or secondary perception data to identify objects and assign categorical labels and unique identifiers to each object detected in a scene. Categorical labels may include categories such as vehicle, bicyclist, pedestrian, building, and the like. Methods of identifying objects and assigning categorical labels to objects are well known in the art, and any suitable classification process may be used, such as those that make bounding box predictions for detected objects in a scene and use convolutional neural networks or other computer vision models. Some such processes are described in Yurtsever et al., "A Survey of Autonomous Driving: Common Practices and Emerging Technologies" (IEEE Access, vol. 8, pp. 58443-58469, 2020).

The primary perception system 121(a) may deliver perception data to the primary controller's primary forecasting system 121(b). The primary forecasting system (which also may be referred to as a prediction system) will include processors and computer-readable programming instructions that are configured to process data received from the primary perception system 121(a) and forecast actions of other actors that the perception system detects. The primary perception system, as well as the primary forecasting system, will deliver data and information to the primary motion planning system 121(c) and primary control system 121(d) so that the receiving systems may assess such data and initiate any number of reactive motions to such data. The primary motion planning system 121(c) and control system 121(d) include and/or share one or more processors and computer-readable programming instructions that are configured to process data received from the other systems, determine a trajectory for the vehicle, and output commands to vehicle hardware to move the vehicle according to the determined trajectory. Example actions that such commands may cause include causing the vehicle's brake control system to actuate, causing the vehicle's acceleration control subsystem to increase speed of the vehicle, or causing the vehicle's steering control subsystem to turn the vehicle. Various motion planning techniques are well known, for example as described in Gonzalez et al., "A Review of Motion Planning Techniques for Automated Vehicles," published in *IEEE Transactions on Intelligent Transportation Systems*, vol. 17, no. 4 (April 2016).

The primary controller 121 may also include a primary diagnostics system 121(e) may include one or more processors, and computer-readable memory with programming instructions and/or trained artificial intelligence models that, during a run of the AV, may monitor the health of the primary controller 121. For example, the primary diagnostics system 122(e) may monitor the health of the primary controller 121 by analyzing information relating to, without limitation, a power supply; memory consistency; health of various communication interfaces (e.g., with sensor systems, the onboard computing device etc. checked using counter, checksum, etc. to determine missing messages, stale messages, corrupt messages or the like); lateral and longitudinal plausibility; active trajectory generation capability status; arbitration health; sensor health data including quality and frequency of data supplied; etc. The primary diagnostics subsystem 121(e) may also monitor for issues in the AVP 123 such as health status, power status, communications health, capability status, arbitration health, etc. Optionally, the AVP 123 may include its own diagnostics system. The primary diagnostics subsystem 121(e) may, optionally, determine whether the AV needs to be transitioned to a minimal risk collision (MRC) state. The primary diagnostics subsystem 121(e) may determine that the AV needs to be transitioned to the MRC state upon detecting, for example, a hardware fault with the primary controller (e.g. memory failure, temp too high, power failure, etc.), perception system publishes a message that fails a plausibility check such as message timeout (e.g., the primary controller does not receive a necessary message within some time threshold), perception system publishes a message that fails a plausibility check such as a software exceeded a latency limit (e.g., time taken from received input to published output), or the like.

The primary diagnostics subsystem 121(e) may transmit an MRC state transition instruction to the complementary controller (e.g., once every diagnostics cycle). Upon receipt of an MRC state transition instruction, the complementary controller may transmit instructions to the AVP to bring the AV to a stop along an active trajectory (discussed below).

The secondary perception system 122(a) may include one or more processors, and computer-readable memory with programming instructions and/or trained artificial intelligence models that, during a run of the AV, will process only the secondary perception data to identify objects and assign categorical labels and unique identifiers to each object detected in a scene (as discussed above). The secondary perception system 122(a) may also receive information from the primary controller 121 such as, without limitation, an active trajectory of the autonomous vehicle, information relating to a current pose of the autonomous vehicle, diagnostics information, and MRC state information. The secondary perception system 122(a) may process and analyze the received information to, for example, determine identify various regions the active trajectory (e.g., reachable region, fallback monitoring region, active monitoring region, etc.—discussed below) and analyze the sensor data (e.g., sensor fusion, false positive checks, etc.) to determine the presence of objects within one or more of the identified regions.

In addition to the secondary perception system 122(a), the complementary controller 122 may also include a path follower system 122(b) including one or more processors and computer-readable programming instructions that are configured to process data received from the other systems, determine whether or not it should pass through the primary controller commands for the AVP to the AVP, initiate a collision mitigation action, initiate emergency braking, or the like. The path follower system may, optionally, output commands to vehicle hardware such as the AVP 123 to move the vehicle based on the determination (e.g., follow a trajectory for collision mitigation, perform emergency braking, etc.).

Optionally, the complementary controller 122 may also include a secondary diagnostics system 122(c) including one or more processors and computer-readable programming instructions that are configured to collect and analyze information relating to the health and functioning of the primary controller 121, the AVP 123, and/or the complementary controller 122 itself. For example, the secondary diagnostics system 122(c) may, without limitation, monitor sensor communication errors (e.g., late, missing, etc.), monitor AVS communication errors (e.g., late, missing, etc.), monitor sensor errors (e.g., quality or frequency of sensor data), monitor task latency, monitor input communication errors (e.g., late, missing, etc.), monitor message size, monitor memory errors, monitor input/output tasks, monitor power supply; or the like. The secondary diagnostics system 122(c) may also receive and analyze primary controller diagnostics information and/or MRC state transition instructions from the primary controller. The secondary diagnostic system 122(c) may process and analyze the received information to, for example, determine errors in the secondary sensor system, the primary controller, errors in pose calculations performed by the complementary controller; errors in functioning of the secondary perception system, or the like. The secondary diagnostics system 122(c) may provide the diagnostics information to the primary diagnostics system 121 (e).

As discussed below, under normal operating conditions, the complementary controller 122 may pass instructions from the primary controller 121 to the AVP 123 for execution. However, under certain conditions (presence of object in an active monitoring region and/or upon occurrence of a triggering event), the complementary controller 122 may stop passing the primary controller 121 instructions, and may instead provide its own instructions (collision mitigation or emergency braking) to the AVP 123 for execution.

Figure 2:
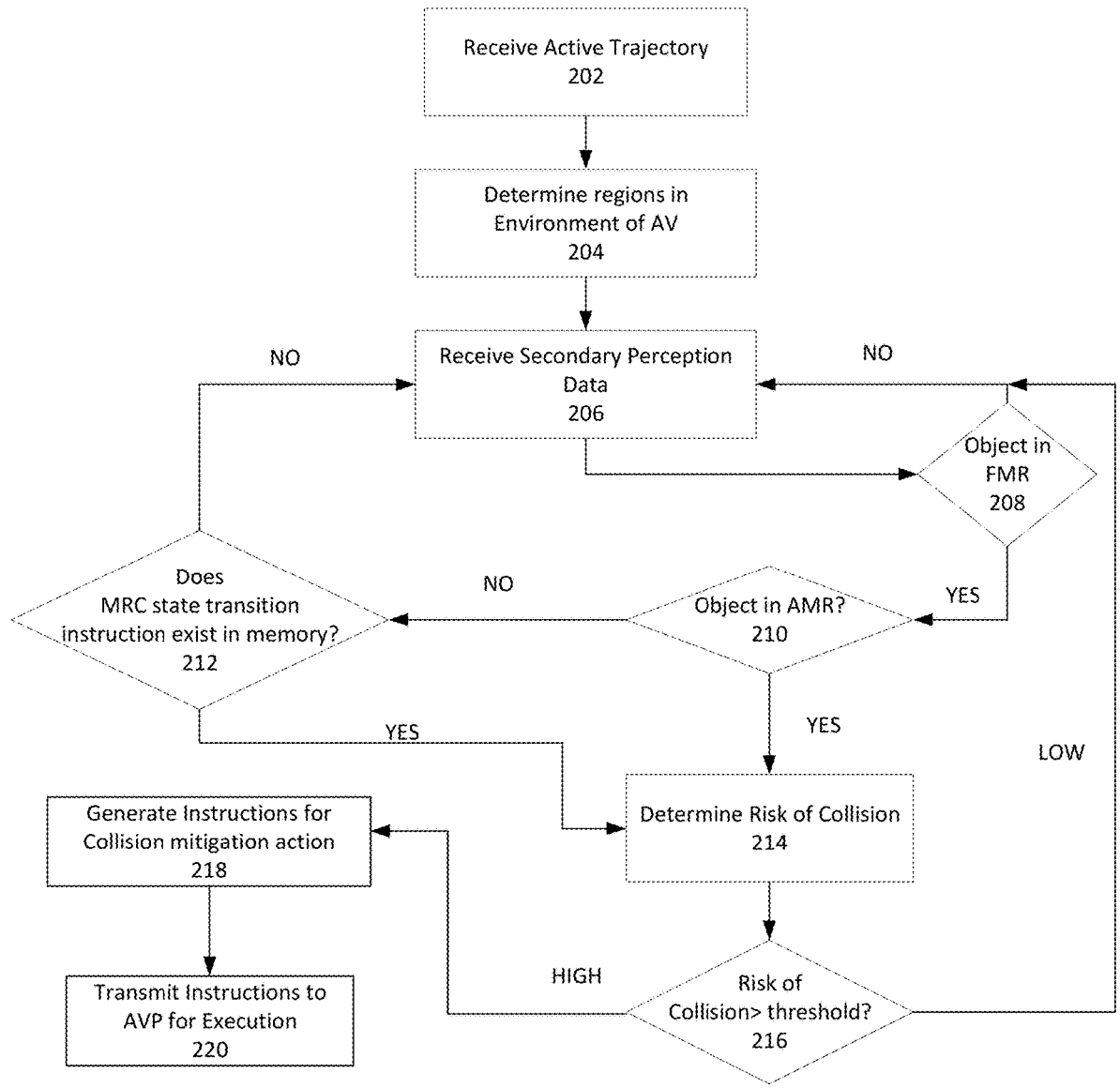
FIG. 2 is a flowchart illustrating an example method for execution of collision mitigation by a complementary controller.

Referring now to FIG. 2, a flowchart illustrating an example method for execution of collision mitigation by a complementary controller is illustrated. At 202, the complementary controller may receive an active trajectory of the AV from the primary controller. As used herein, an active trajectory of the AV refers to a path that the AV intends to follow for a planning horizon (for example, within the next 5 seconds, 10 seconds 15 seconds, or the like), and includes a pose and velocity of the AV at one or more points (or each point) along the path. The trajectory may also include AV acceleration at points along the path. The primary controller may generate the active trajectory using any now or hereafter known methods. The active trajectory information may be transmitted to the complementary controller at a frequency of about 5-15 Hz, about 6-14 Hz, about 7-13 Hz, about 8-12 Hz, about 9-11 Hz, about 8 Hz, about 9 Hz, about 10 Hz, about 11 Hz, or the like (i.e., for each planning horizon). In various implementations, the primary controller ensures that the path is feasible for the AV to execute.

Figure 3:
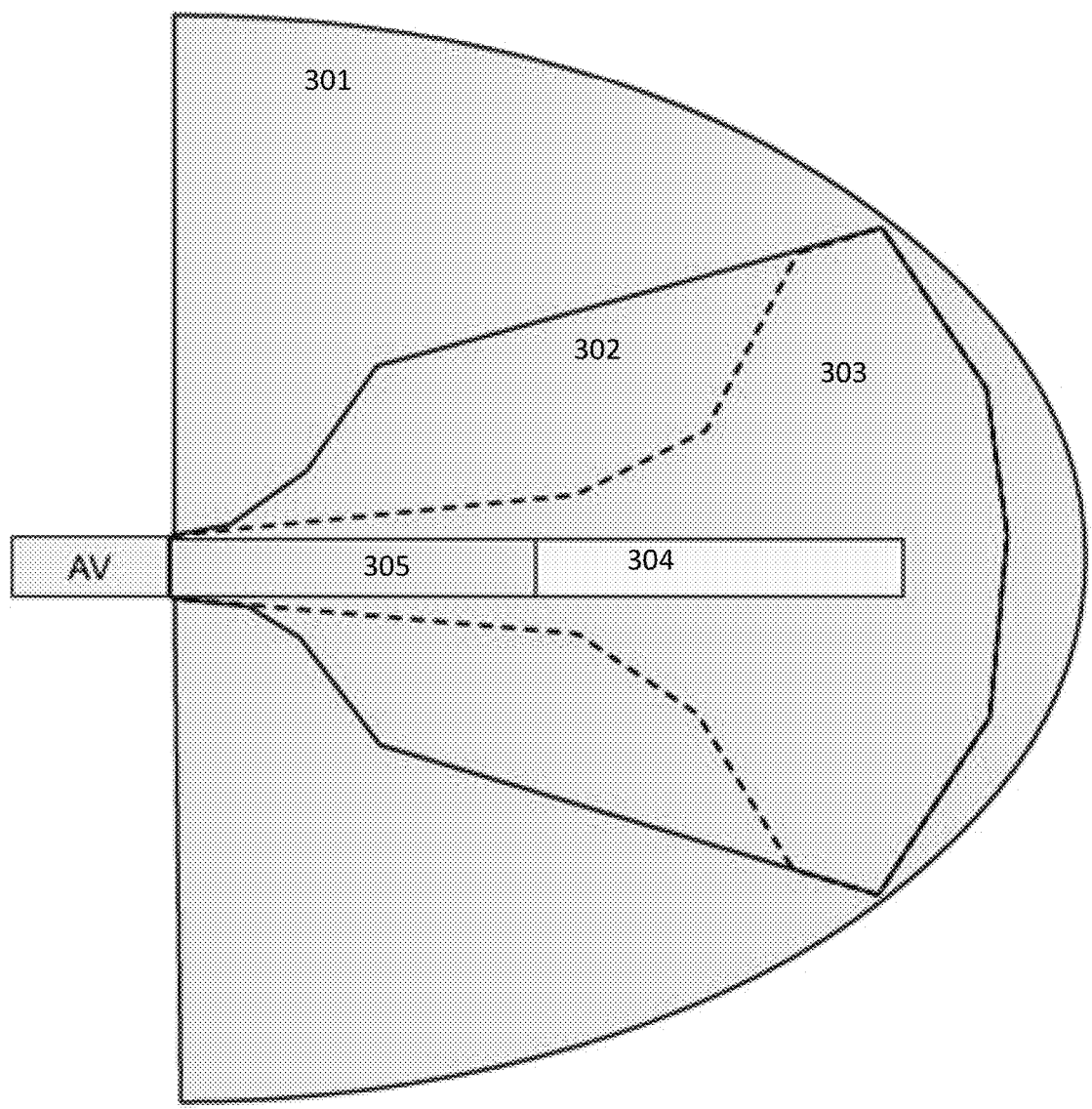
FIG. 3 illustrates example monitoring regions determined in the immediate environment of the autonomous vehicle.

At 204, the complementary controller may determine, based on the received active trajectory, one or more regions in an immediate environment of the AV (e.g., regions around the AV, regions along the active trajectory, etc.). The regions may include, without limitation, a field of view region, a reachable region, an instantaneous reachable region, an active monitoring region (AMR), and/or a fallback monitoring region (FMR). As used herein, the field of view region 301 (in FIG. 3) refers to a region defined by the collective field of the secondary sensors from which the AV may collect secondary perception data, while following the active trajectory. The reachable region refers to a union of all trajectory rollouts to achieve a desired terminal velocity (i.e., points or regions that the AV can reach at the desired terminal velocity) from any potential initial position upon application of maximum allowed braking from an initial position, and is shown as region 302 in FIG. 3. The terminal velocity may be about 0 to about 5 miles/hr, about 1-4 miles/hr, or about 2-3 miles per/hr. The instantaneous region, on the other hand, refers to a subset of the reachable region that is a union of all trajectory rollouts to achieve the desired terminal velocity given the AV's current state (e.g., velocity, pose, etc.), and is shown as region 303 in FIG. 3. The FMR (shown as 304 in FIG. 3) refers to a polygon along the active trajectory, the polygon having a length from the AV's current position to a stopping point, where the stopping point is a point on the active trajectory that can be reached by the AV at an allowed first deceleration rate given the AV's current speed and pose. The first deceleration rate may be determined such that the AV may come to a stop or reach a desired terminal velocity without an object traveling behind the AV (at a reasonable distance and/or speed as per the local traffic laws) colliding with the AV. The AMR (shown as 305 in FIG. 3) refers to a polygon within the FMR the polygon having a length from the AV's current position to a stopping point, where the stopping point is a point on the active trajectory that can be reached by the AV at a second deceleration rate (greater than the first deceleration rate) given the AV's current speed and pose. The second deceleration rate may be achieved based on the maximum allowed braking power given the current state of the AV, environmental conditions (e.g., weather, road conditions, etc.); and/or a deceleration rate achieved at a barking power less than the maximum allowed braking power (e.g., for bringing the AV to a stop within a predetermined distance). It should be noted that the above regions are continuously updated as the AV follows the active trajectory.

The complementary controller may then receive secondary perception data corresponding to a perception region from the secondary sensors (206), and analyze the secondary perception data to determine whether there is an object present within the FMR (208). A perception region (not shown here) refers to a region within the field of view region from which the complementary controller will collect secondary perception data. The perception region may be determined based on a current pose state of the vehicle (e.g., heading, location, speed, etc.). The objects may include traffic signals, roadway boundaries, other vehicles, pedestrians, and/or obstacles, etc. For an object that is detected within the FMR, the complementary controller may also determine, for the detected object in the FMR, the current state of the object. The state information may include, without limitation, for each object: current location; current speed and/or acceleration, current heading; current pose; current shape, size, or footprint; type (e.g., vehicle, pedestrian, bicycle, static object, obstacle); and/or other state information. If an object is not detected within the FMR (208: NO), the complementary controller may continue receiving sensor data (206) and monitoring the fallback monitoring region.

However, if an object is detected within the FMR (208: YES), the complementary controller may determine whether the detected object is located within the AMR (210). As discussed above, the complementary controller may determine the state of the objects detected within the fallback monitoring region that includes the current location and can be used to determine whether the object is in the AMR. If the object is not located within the AMR (210: NO), the complementary controller may determine if there is a currently valid MRC state transition instruction from the primary controller (212) (e.g., stored and/or received within a threshold time).

If the there is a currently valid MRC state transition instruction from the primary controller (212: YES) and/or if the detected object is determined to be located within the AMR (210: YES), the complementary controller may determine a risk of collision with the object (214). If the risk of collision is determined to be higher than a given threshold (216: HIGH), the complementary controller the complementary controller may generate instructions for initiating and executing a collision mitigation action at 218.

The complementary controller may determine the risk of collision based on, for example, factors such as object state (e.g., type of object, size of object, longitudinal distance, lateral position within the AMR, range, range rate, longitudinal velocity, lateral velocity, uncertainty/confidence associated with object state prediction, temporal persistence, etc.); state of the AV (e.g., brake models, pose, speed, etc.); environmental factors (e.g., road geometry, road condition, etc.); sensing pipeline preference (Radar/Lidar data on objects, cross-section, range, etc.); detection pipeline performance (e.g., run-time, confidence, heterogeneous without velocity, heterogeneous performance, etc.). For example, if the object is small/not heavy (e.g., a cardboard box), the risk of collision may be deemed low (i.e., below the threshold) compared to if the object is a vulnerable road user or another vehicle (i.e., above the threshold). In other words, the complementary controller may only consider objects in the AMR as being associated with a potential high risk of collision that have a certain weight, dimensions, density, mass, or the like, and disregard objects detected in the FMR/AMR that do not have the required characteristics (e.g., plastic bumpers, cinder blocks, semi tire treads, small construction debris, or the like). Similarly, if the object is in the AMR but is moving away from a AV at a relative speed that is at least equal to or more than that of the AV, the risk of collision may be determined to be low. In other example, if the object is another vehicle that is at least partially present within the AMR but the velocity of the object is determined with less than a desired confidence by the detection pipeline, the risk of collision may be determined to be high. In yet another example, the risk of collision may be high if, based on the AV's state it is determined that the AV will collide with the object (e.g., a vehicle) and/or come within a threshold distance of the object even upon application of maximum braking power while the object is within the AMR. Similarly, a risk of collision with an object may be determined to be high if, for example, the object is suddenly detected within the AMR (i.e., from outside of field of view of the secondary sensors) or when an object is revealed later (i.e., when already in the AMR). A time to collision may be determined based on the current AV state and the object state (e.g., current velocity, predicted trajectory, etc.); and a risk of collision may be determined to be high if the time to collision is less than a threshold time (e.g., less than a time that the AV will take to come to a stop without colliding with the object upon application of maximum allowed braking power). Other similar scenarios for risk assessment are within the scope of this disclosure.

Example of a collision mitigation action may include causing the AVP to execute maximum allowed braking to bring the AV to a complete stop immediately along the active trajectory before it collides with the object in the FMR. Other examples may include, without limitation steering along the active trajectory, issue a warning signal (e.g., horn, etc.), issue an alert to a passenger of the AV), or the, like.

The collision mitigation action may also be tailored based on the secondary perception data. For example, if an object is closely following behind the AV, the collision mitigation action may include a deceleration rate that falls within the allowable deceleration range for such a scenario to avoid the object from colliding with the back of the AV (e.g., about 0.28-0.32 g or about 0.3 g average deceleration from 45 mph). In another example, if an object is detected within the AMR, the collision mitigation action allows the AV to come to a stop before colliding with the object and/or at least at a threshold buffer distance from the object. If the AV is approaching an area of occlusion, the collision mitigation action allows the AV to come to a stop before a region of the area of occlusion where an object might appear and/or at least at a threshold buffer distance from the region. Similarly, if there is a vehicle in front of the AV changing lanes that may cause late reveal of an object, the collision mitigation action may allow the AV to come to a stop before a region of the area of occlusion where an object might appear and/or at least at a threshold buffer distance from the area of occlusion However, if the complementary controller has not received an MRC state transition instruction from the primary controller (212: NO), the complementary controller may continue receiving sensor data (206) and monitoring the fallback monitoring region and/or the detected object. Optionally, the system may also perform detection, tracking, and prediction (by, for example, monitoring a region outside the AMR) to predict if a detected object is going to enter the AMR within a threshold time, determine a time to collision, or the like.

At 220, the complementary controller may transmit the generated instructions to the AVP to execute the determined collision mitigation action (e.g., cause the brake controller to apply maximum allowed braking power). Upon initiation of a collision mitigation action, the complementary controller may stop passing, to the AVP, the instructions received from the primary controller for the AVP.

Optionally, the complementary controller may not initiate a collision mitigation action at 218 if, based on the diagnostics information relating to the complementary controller, it is determined that one or more functions/components of the complementary controller include an internal error that is more than a corresponding threshold. Examples of such errors may include, for example, pose calculation error (i.e., pose determined by primary controller is different from that determined by the complementary controller by more than a threshold), perception error, sensor error, sensor communication errors, a hardware fault with the secondary controller (e.g. memory failure, temp too high, power failure, etc.), secondary perception system publishes a message that fails a plausibility check such as message timeout (e.g., the secondary controller does not receive a necessary message within some time threshold), secondary perception system publishes a message that fails a plausibility check such as a software exceeded a latency limit (e.g., time taken from received input to published output), or the like. In such scenarios, the complementary controller may continue passing instructions from the primary controller to the AVP, and/or may provide an error status to the primary controller and/or a global diagnostics system of the AV.

If the risk of collision is determined to be less than the threshold (216: LOW), the complementary controller may continue receiving sensor data (206) and monitoring the fallback monitoring region and/or the detected object. Optionally, the system may also perform detection, tracking, and prediction (by, for example, monitoring a region outside the AMR) to predict if a detected object is going to enter the AMR within a threshold time, determine a time to collision, or the like.

In certain implementations, the complementary controller may also initiate a collision mitigation action when the instructions for the AVP (from the primary controller) include instructions to perform deceleration at a specified rate that is less than the maximum allowed deceleration that the AVP can cause the AV to execute. In such scenarios, the complementary controller may stop passing instructions from the primary controller to the AVP, and instead initiate collision mitigation to bring the AV to a stop by application of maximum allowed deceleration.

Figure 4:
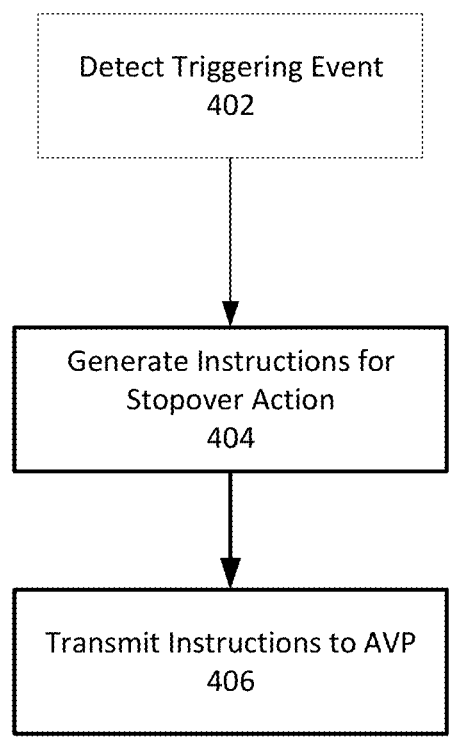
FIG. 4 is a flowchart illustrating an example method for execution of failover stopping action by a complementary controller.

FIG. 4 is a flowchart illustrating an example method for execution of a failover stop action by a complementary controller. At 402, the complementary controller may detect occurrence of a triggering event, the triggering event being associated with a MRC transition state that requires the AV to smoothly come to a stop (without maximum deceleration action).

In some implementations, the triggering event may be receipt of instructions from the primary controller to initiate the MRC transition state. As discussed above, the primary controller may transmit such an instruction upon detection of a triggering event/fault within the primary controller, the AVP, or other components of the AV. Examples of such triggering events may include, without limitation, loss of communication between the primary controller and one or more sensors of the primary sensor system such that the primary controller cannot receive sensor data, power failure of the primary controller, internal faults in the primary controller (e.g., main processor failure, PCI switch failure, Ethernet switch failure), loss of communication between the primary controller and the AVP, loss of power to the AVP, primary controller breakdown, AVP breakdown, or the like. It should be noted that the triggering event may be any scenario when the primary controller is unable to bring the AV to a safe stop and/or safely navigate the AV.

In certain other implementations, the complementary controller may determine that a triggering event has occurred based on diagnostics information relating to communications between the primary controller and the complementary controller (e.g., missing/stale/corrupt messages), communications between the sensors and the complementary controller (e.g., missing/stale/corrupt messages), hardware fault with the primary controller, secondary controller, or the AVP (e.g. memory failure, temp too high, power failure, etc.), perception system(s) publishes a message that fails a plausibility check such as message timeout (e.g., the primary/secondary controller does not receive a necessary message within some time threshold), perception system(s) publishes a message that fails a plausibility check such as a software exceeded a latency limit (e.g., time taken from received input to published output), or the like.

Upon detection of the triggering event, the complementary controller may use the last received active trajectory from the primary controller (e.g., a trajectory received within the last 100 ms and/or any other desired time period) to generate instructions for bringing the AV to a stop along the active trajectory (404) (i.e., transition to a MRC state), and transmit the instructions to the AVP (406). The generated instructions may include a smooth deceleration to a stopping point along the active trajectory. A rule set providing different allowable deceleration ranges for various scenarios, distance to edge of drivable surface, distance to opposing traffic lane, distance from planned path of the AV, or the like, may be provided to the complementary controller. Optionally, the instructions may include a collision mitigation action if an object is detected within the FMR (as discussed above).

Upon detection of a triggering event, the complementary controller may also stop passing instructions from the primary controller (for the AVP) to the AVP.

Figure 5:
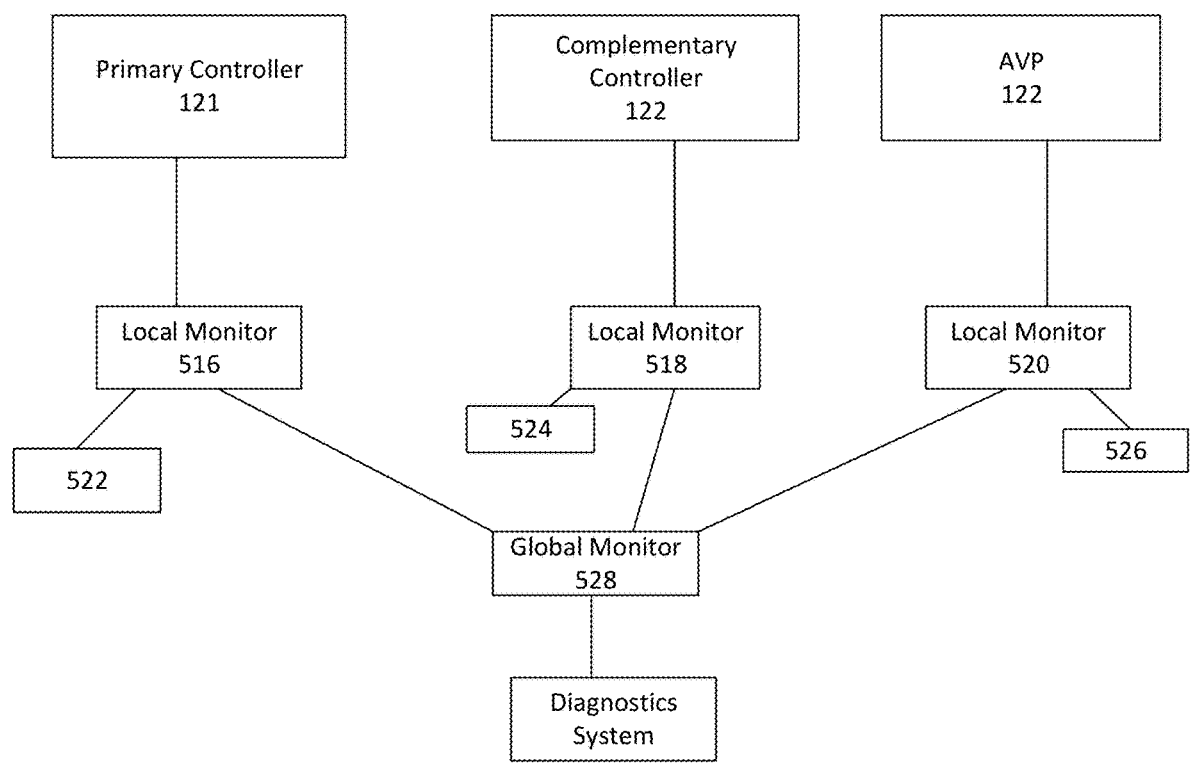
FIG. 5 is a block diagram illustrating local and global monitors for performing diagnostics.

In some embodiments, the complementary controller may determine that a triggering event has occurred based on information received from, for example, the primary diagnostics subsystem of the primary controller, the primary controller, the secondary diagnostics system, and/or from the AVP (e.g., AVP diagnostics). Such diagnostics information may be collected using local monitors. For example, as illustrated in FIG. 5, the diagnostics systems of the primary controller, the complementary controller, and/or the AVP may be in communication with a local monitor 516, 518, 520. A local monitor 516, 518, 520 may be implemented using hardware, software or a combination of hardware. For instance, a local monitor 516, 518, 520 may be implemented as part of a microcontroller. A local monitor 516, 518, 520 may include one or more of a register or data store for temporarily storing data, a comparator for comparing data, programmed circuitry for performing one or more cryptographic operations and/or the like. A local monitor 516, 518, 520 may receive data pertaining to one or more functions executed by a subsystem, and may use this information to verify at least a portion of the execution flow to which the function(s) pertain.

FIG. 5 also illustrates example non-volatile memory (NVM) 522, 524, 526, which may be used to store information, as discussed in more detail throughout this disclosure. In various embodiments, an NVM 522, 524, 526 may include a master hash table. A master hash table refers to a data structure that stores encrypted and/or encoded information associated with one or more functions.

As shown in FIG. 5, a monitoring system 500 may include a global monitor 525. A global monitor 528 may be implemented using hardware, software or a combination of hardware. For instance, a global monitor 528 may be implemented as part of a microcontroller. A global monitor 528 may include one or more of a register or data store for temporarily storing data, a comparator for comparing data, programmed circuitry for performing one or more cryptographic operations and/or the like. A global monitor 528 may be in communication with one or more of the local monitors 516, 518, 520. Local monitors 516, 518, 520 may send to a global monitor 528 information pertaining to functions or tasks executed by one or more of their associated subsystems. The global monitor 528 may use this information to monitor, detect or track patterns at a higher system level. In other words, a local monitor 516, 518, 520 may detect faults or anomalies at a local level, while a global monitor 528 may detect system level faults over a period of time. In various embodiments, a global monitor 528 may be in communication with a diagnostics system such as the primary diagnostics subsystem and/or the secondary diagnostics subsystem.

It is understood that additional or alternate subsystems, along with additional or fewer local monitors, NVMs and/or configurations of each may be used within the scope of this disclosure.

Figure 6:
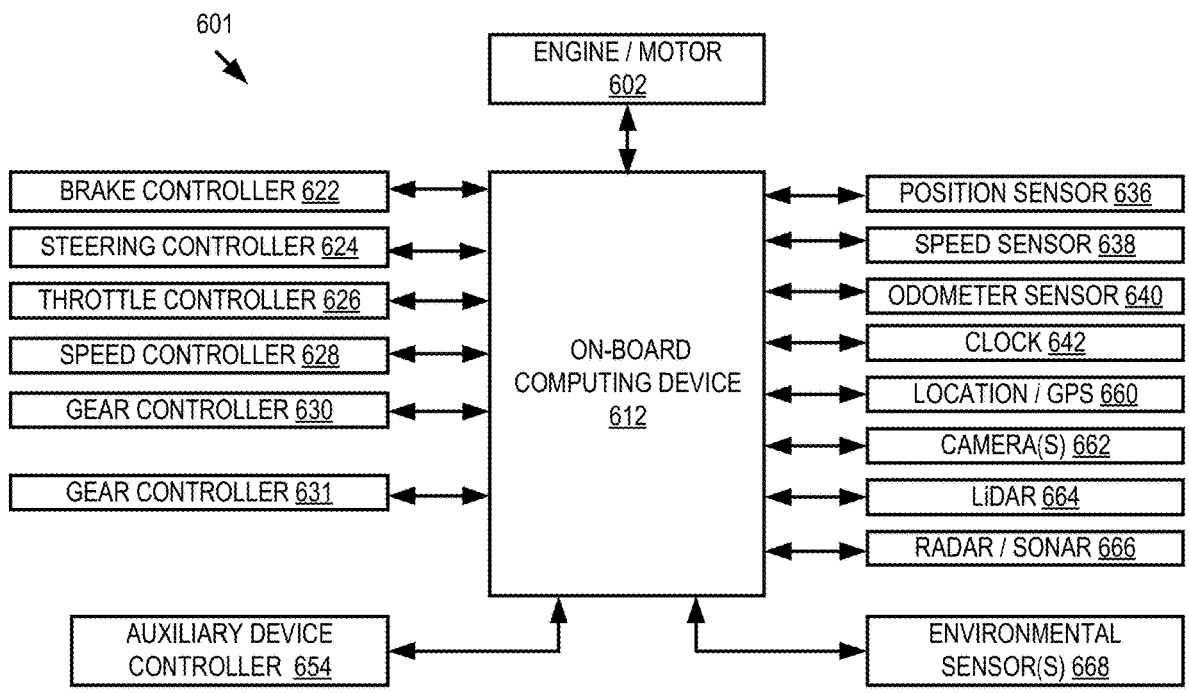
FIG. 6 illustrates a block diagram of various components of an example primary controller of an autonomous vehicle.

FIG. 6 illustrates an example system architecture for a vehicle 601, such as the autonomous vehicle 101 of FIG. 1 autonomous vehicle. The vehicle 601 may include an engine or motor 602 and various sensors for measuring various parameters of the vehicle and/or its environment. Operational parameter sensors that are common to both types of vehicles include, for example: a position sensor 636 such as an accelerometer, gyroscope and/or inertial measurement unit; a speed sensor 638; and an odometer sensor 640. The vehicle 601 also may have a clock 642 that the system architecture uses to determine vehicle time during operation. The clock 642 may be encoded into the vehicle on-board computing device 612. It may be a separate device, or multiple clocks may be available.

The vehicle 601 also may include various sensors that operate to gather information about the environment in which the vehicle is traveling. These sensors may include, for example: a location sensor 660 such as a GPS device; object detection sensors such as one or more cameras 666; a LiDAR sensor system 664; and/or a radar and or and/or a sonar system 666. The sensors also may include environmental sensors 668 such as a precipitation sensor and/or ambient temperature sensor. The object detection sensors may enable the vehicle 601 to detect objects that are within a given distance or range of the vehicle 601 in any direction, while the environmental sensors collect data about environmental conditions within the vehicle's area of travel. The system architecture will also include one or more cameras 662 for capturing images of the environment. Any or all of these sensors will capture sensor data that will enable one or more processors of the vehicle's on-board computing device 612 and/or external devices to execute programming instructions that enable the computing system to classify objects in the perception data, and all such sensors, processors and instructions may be considered to be the vehicle's perception system. The vehicle also may receive information from a communication device (such as a transceiver, a beacon and/or a smart phone) via one or more wireless communication link, such as those known as vehicle-to-vehicle, vehicle-to-object or other V2X communication links. The term "V2X" refers to a communication between a vehicle and any object that the vehicle may encounter or affect in its environment.

During operations, information is communicated from the sensors to an on-board computing device 612. The on-board computing device 612 analyzes the data captured by the sensors and optionally controls operations of the vehicle based on results of the analysis. For example, the on-board computing device 612 may control braking via a brake controller 628; direction via a steering controller 624; speed and acceleration via a throttle controller 626 (in a gas-powered vehicle) or a motor speed controller 622 (such as a current level controller in an electric vehicle); a differential gear controller 630 (in vehicles with transmissions); and/or other controllers such as an auxiliary device controller 654.

Geographic location information may be communicated from the location sensor 660 to the on-board computing device 612, which may then access a map of the environment that corresponds to the location information to determine known fixed features of the environment such as streets, buildings, stop signs and/or stop/go signals. Captured images from the cameras 662 and/or object detection information captured from sensors such as a LiDAR system 664 is communicated from those sensors to the on-board computing device 612. The object detection information and/or captured images may be processed by the on-board computing device 612 to detect objects in proximity to the vehicle 601. In addition or alternatively, the vehicle 601 may transmit any of the data to a remote server system 103 (FIG. 1) for processing. Any known or to be known technique for making an object detection based on sensor data and/or captured images can be used in the embodiments disclosed in this document.

In addition, the autonomous vehicle may include an onboard display device (not shown here) that may generate and output interface on which sensor data, vehicle status information, or outputs generated by the processes described in this document (e.g., various maps and routing information) are displayed to an occupant of the vehicle. The display device may include, or a separate device may be, an audio speaker that presents such information in audio format.

The on-board computing device 612 may obtain, retrieve, and/or create map data that provides detailed information about the surrounding environment of the autonomous vehicle. The on-board computing device 612 may also determine the location, orientation, pose, etc. of the AV in the environment (localization) based on, for example, three dimensional position data (e.g., data from a GPS), three dimensional orientation data, predicted locations, or the like. For example, the on-board computing device 612 may receive GPS data to determine the AV's latitude, longitude and/or altitude position. Other location sensors or systems such as laser-based localization systems, inertial-aided GPS, or camera-based localization may also be used to identify the location of the vehicle. The location of the vehicle may include an absolute geographical location, such as latitude, longitude, and altitude as well as relative location information, such as location relative to other cars immediately around it which can often be determined with less noise than absolute geographical location. The map data can provide information regarding: the identity and location of different roadways, road segments, lane segments, buildings, or other items; the location, boundaries, and directions of traffic lanes (e.g., the location and direction of a parking lane, a turning lane, a bicycle lane, or other lanes within a particular roadway) and metadata associated with traffic lanes; traffic control data (e.g., the location and instructions of signage, traffic lights, or other traffic control devices); and/or any other map data that provides information that assists the on-board computing device 612 in analyzing the surrounding environment of the autonomous vehicle 601.

In certain embodiments, the map data may also include reference path information that correspond to common patterns of vehicle travel along one or more lanes such that the motion of the object is constrained to the reference path (e.g., locations within traffic lanes on which an object commonly travels). Such reference paths may be pre-defined such as the centerline of the traffic lanes. Optionally, the reference path may be generated based on historical observations of vehicles or other objects over a period of time (e.g., reference paths for straight line travel, lane merge, a turn, or the like).

In certain embodiments, the on-board computing device 612 may also include and/or may receive information relating to the trip or route of a user, real-time traffic information on the route, or the like.

The on-board computing device 612 may include and/or may be in communication with a routing controller 631 that generates a navigation route from a start position to a destination position for an autonomous vehicle. The routing controller 631 may access a map data store to identify possible routes and road segments that a vehicle can travel on to get from the start position to the destination position. The routing controller 631 may score the possible routes and identify a preferred route to reach the destination. For example, the routing controller 631 may generate a navigation route that minimizes Euclidean distance traveled or other cost function during the route, and may further access the traffic information and/or estimates that can affect an amount of time it will take to travel on a particular route. Depending on implementation, the routing controller 631 may generate one or more routes using various routing methods, such as Dijkstra's algorithm, Bellman-Ford algorithm, or other algorithms. The routing controller 631 may also use the traffic information to generate a navigation route that reflects expected conditions of the route (e.g., current day of the week or current time of day, etc.), such that a route generated for travel during rush-hour may differ from a route generated for travel late at night. The routing controller 631 may also generate more than one navigation route to a destination and send more than one of these navigation routes to a user for selection by the user from among various possible routes.

In various embodiments, an on-board computing device 612 may determine perception information of the surrounding environment of the autonomous vehicle 601. Based on the sensor data provided by one or more sensors and location information that is obtained, the on-board computing device 612 may determine perception information of the surrounding environment of the autonomous vehicle 601. The perception information may represent what an ordinary driver would perceive in the surrounding environment of a vehicle. The perception data may include information relating to one or more objects in the environment of the autonomous vehicle 601. For example, the on-board computing device 612 may process sensor data (e.g., LiDAR or RADAR data, camera images, etc.) in order to identify objects and/or features in the environment of autonomous vehicle 601. The objects may include traffic signals, road way boundaries, other vehicles, pedestrians, and/or obstacles, etc. The on-board computing device 612 may use any now or hereafter known object recognition algorithms, video tracking algorithms, and computer vision algorithms (e.g., track objects frame-to-frame iteratively over a number of time periods) to determine the perception.

In some embodiments, the on-board computing device 612 may also determine, for one or more identified objects in the environment, the current state of the object. The state information may include, without limitation, for each object: current location; current speed and/or acceleration, current heading; current pose; current shape, size, or footprint; type (e.g., vehicle vs. pedestrian vs. bicycle vs. static object or obstacle); and/or other state information.

The on-board computing device 612 may perform one or more prediction and/or forecasting operations. For example, the on-board computing device 612 may predict future locations, trajectories, and/or actions of one or more objects. For example, the on-board computing device 212 may predict the future locations, trajectories, and/or actions of the objects based at least in part on perception information (e.g., the state data for each object comprising an estimated shape and pose determined as discussed below), location information, sensor data, and/or any other data that describes the past and/or current state of the objects, the autonomous vehicle 601, the surrounding environment, and/or their relationship(s). For example, if an object is a vehicle and the current driving environment includes an intersection, the on-board computing device 612 may predict whether the object will likely move straight forward or execute a turn. If the perception data indicates that the intersection has no traffic light, the on-board computing device 612 may also predict whether the vehicle may have to fully stop prior to enter the intersection.

In various embodiments, the on-board computing device 612 may determine a motion plan for the autonomous vehicle. For example, the on-board computing device 612 may determine a motion plan for the autonomous vehicle based on the perception data and/or the prediction data. Specifically, given predictions about the future locations of proximate objects and other perception data, the on-board computing device 612 can determine a motion plan for the autonomous vehicle 201 that best navigates the autonomous vehicle relative to the objects at their future locations.

In one or more embodiments, the on-board computing device 612 may receive predictions and make a decision regarding how to handle objects and/or actors in the environment of the autonomous vehicle 601. For example, for a particular actor (e.g., a vehicle with a given speed, direction, turning angle, etc.), the on-board computing device 612 decides whether to overtake, yield, stop, and/or pass based on, for example, traffic conditions, map data, state of the autonomous vehicle, etc. Furthermore, the on-board computing device 612 also plans a path for the autonomous vehicle 201 to travel on a given route, as well as driving parameters (e.g., distance, speed, and/or turning angle). That is, for a given object, the on-board computing device 612 decides what to do with the object and determines how to do it. For example, for a given object, the on-board computing device 612 may decide to pass the object and may determine whether to pass on the left side or right side of the object (including motion parameters such as speed). The on-board computing device 612 may also assess the risk of a collision between a detected object and the autonomous vehicle 601. If the risk exceeds an acceptable threshold, it may determine whether the collision can be avoided if the autonomous vehicle follows a defined vehicle trajectory and/or implements one or more dynamically generated emergency maneuvers is performed in a pre-defined time period (e.g., N milliseconds). If the collision can be avoided, then the on-board computing device 612 may execute one or more control instructions to perform a cautious maneuver (e.g., mildly slow down, accelerate, change lane, or swerve). In contrast, if the collision cannot be avoided, then the on-board computing device 612 may execute one or more control instructions for execution of an emergency maneuver (e.g., brake and/or change direction of travel).

As discussed above, planning and control data regarding the movement of the autonomous vehicle is generated for execution. The on-board computing device 612 may, for example, control braking via a brake controller; direction via a steering controller; speed and acceleration via a throttle controller (in a gas-powered vehicle) or a motor speed controller (such as a current level controller in an electric vehicle); a differential gear controller (in vehicles with transmissions); and/or other controllers.

Referring back to FIG. 5, the communications interface 514 may be configured to allow communication between autonomous vehicle 501 and external systems, such as, for example, external devices, sensors, other vehicles, servers, data stores, databases etc. Communications interface 514 may utilize any now or hereafter known protocols, protection schemes, encodings, formats, packaging, etc. such as, without limitation, Wi-Fi, an infrared link, Bluetooth, etc. User interface system 516 may be part of peripheral devices implemented within a vehicle 101 including, for example, a keyboard, a touch screen display device, a microphone, and a speaker, etc.

In the various embodiments discussed in this document, the description may state that the vehicle or a controller included in the vehicle (e.g., in an on-board computing system) may implement programming instructions that cause the vehicle and/or a controller to make decisions and use the decisions to control operations of the vehicle. However, the embodiments are not limited to this arrangement, as in various embodiments the analysis, decision making and/or operational control may be handled in full or in part by other computing devices that are in electronic communication with the vehicle's on-board computing device and/or vehicle control system. Examples of such other computing devices include an electronic device (such as a smartphone) associated with a person who is riding in the vehicle, as well as a remote server that is in electronic communication with the vehicle via a wireless communication network. The processor of any such device may perform the operations that will be discussed below.

In the various embodiments discussed in this document, the description may state that the vehicle or a controller included in the vehicle (e.g., in an on-board computing system) may implement programming instructions that cause the controller to make decisions and use the decisions to control operations of one or more vehicle systems via the AVP of the vehicle. However, the embodiments are not limited to this arrangement, as in various embodiments the analysis, decision making and or operational control may be handled in full or in part by other computing devices that are in electronic communication with the vehicle's on-board controller and/or AVP. Examples of such other computing devices include an electronic device (such as a smartphone) associated with a person who is riding in the vehicle, as well as a remote server that is in electronic communication with the vehicle via a wireless communication network. The processor of any such device may perform the operations that will be discussed below.

It should be noted that while the above description describes execution of the collision mitigation action and the execution of a failover stop action by the complementary controller as distinct processes, the disclosure is not so limiting. Some or all of the steps for execution of the collision mitigation action and the execution of a failover stop action may be performed by the complementary controller simultaneously and/or contemporaneously depending on the object and/or its current/predicted behavior in the environment of the AV.

Figure 7:
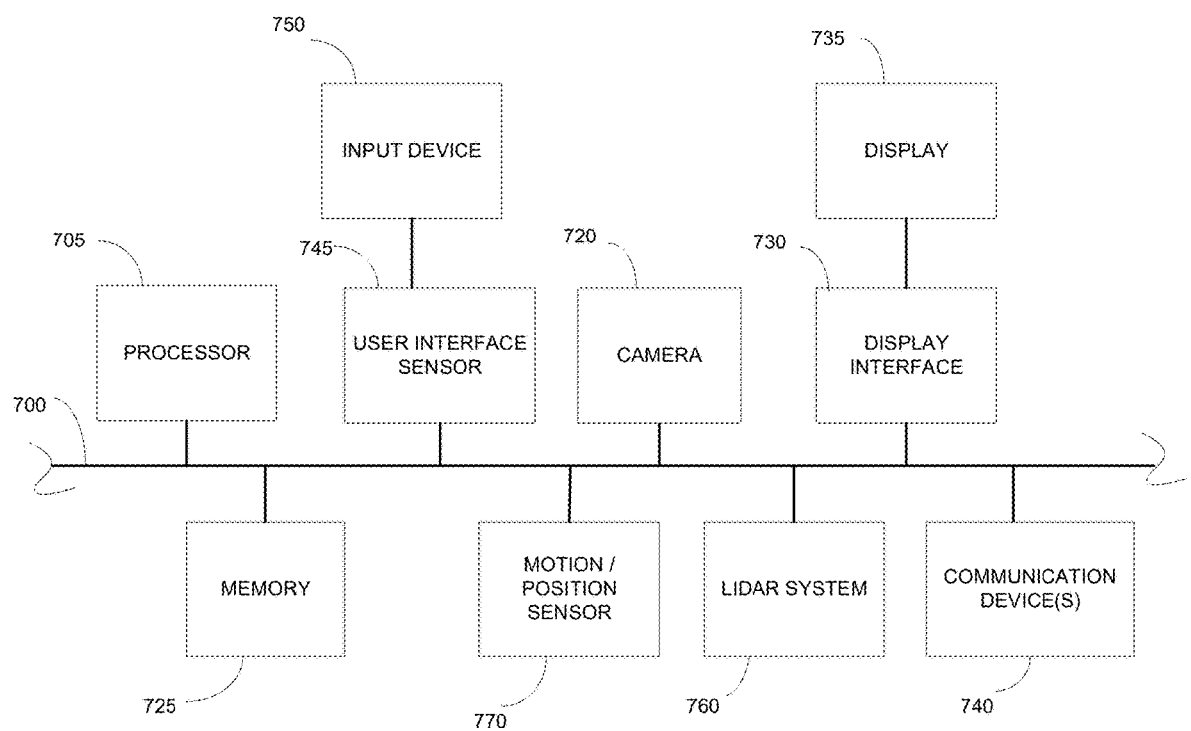
FIG. 7 is a block diagram that illustrates various elements of a possible electronic subsystem of an AV and/or external electronic device.

FIG. 7 depicts an example of internal hardware that may be included in any of the electronic components of the system, such as internal processing systems of the AV, external monitoring and reporting systems, or remote servers. An electrical bus 700 serves as an information highway interconnecting the other illustrated components of the hardware. Processor 705 is a central processing device of the system, configured to perform calculations and logic operations required to execute programming instructions. As used in this document and in the claims, the terms "processor" and "processing device" may refer to a single processor or any number of processors in a set of processors that collectively perform a set of operations, such as a central processing unit (CPU), a graphics processing unit (GPU), a remote server, or a combination of these. Read only memory (ROM), random access memory (RAM), flash memory, hard drives and other devices capable of storing electronic data constitute examples of memory devices 725. A memory device may include a single device or a collection of devices across which data and/or instructions are stored. Various embodiments of the invention may include a computer-readable medium containing programming instructions that are configured to cause one or more processors, and/or devices to perform the functions described in the context of the previous figures.

An optional display interface 730 may permit information from the bus 700 to be displayed on a display device 735 in visual, graphic or alphanumeric format, such on an in-dashboard display system of the vehicle. An audio interface and audio output (such as a speaker) also may be provided. Communication with external devices may occur using various communication devices 740 such as a wireless antenna, a radio frequency identification (RFID) tag and/or short-range or near-field communication transceiver, each of which may optionally communicatively connect with other components of the device via one or more communication system. The communication device(s) 740 may be configured to be communicatively connected to a communications network, such as the Internet, a local area network or a cellular telephone data network.

The hardware may also include a user interface sensor 745 that allows for receipt of data from input devices 750 such as a keyboard or keypad, a joystick, a touchscreen, a touch pad, a remote control, a pointing device and/or microphone. Digital image frames also may be received from a camera 720 that can capture video and/or still images. The system also may receive data from a motion and/or position sensor 770 such as an accelerometer, gyroscope or inertial measurement unit. The system also may receive data from a LiDAR system 760 such as that described earlier in this document.

The above-disclosed features and functions, as well as alternatives, may be combined into many other different systems or applications. Various components may be implemented in hardware or software or embedded software. Various presently unforeseen or unanticipated alternatives, modifications, variations or improvements may be made by those skilled in the art, each of which is also intended to be encompassed by the disclosed embodiments.

Terminology that is relevant to the disclosure provided above includes:

An "automated device" or "robotic device" refers to an electronic device that includes a processor, programming instructions, and one or more physical hardware components that, in response to commands from the processor, can move with minimal or no human intervention. Through such movement, a robotic device may perform one or more automatic functions or function sets. Examples of such operations, functions or tasks may include without, limitation, operating wheels or propellers to effectuate driving, flying or other transportation actions, operating robotic lifts for loading, unloading, medical-related processes, construction-related processes, and/or the like. Example automated devices may include, without limitation, autonomous vehicles, drones and other autonomous robotic devices.

The term "vehicle" refers to any moving form of conveyance that is capable of carrying either one or more human occupants and/or cargo and is powered by any form of energy. The term "vehicle" includes, but is not limited to, cars, trucks, vans, trains, autonomous vehicles, aircraft, aerial drones and the like. An "autonomous vehicle" is a vehicle having a processor, programming instructions and drivetrain components that are controllable by the processor without requiring a human operator. An autonomous vehicle may be fully autonomous in that it does not require a human operator for most or all driving conditions and functions. Alternatively, it may be semi-autonomous in that a human operator may be required in certain conditions or for certain operations, or that a human operator may override the vehicle's autonomous system and may take control of the vehicle. Autonomous vehicles also include vehicles in which autonomous systems augment human operation of the vehicle, such as vehicles with driver-assisted steering, speed control, braking, parking and other advanced driver assistance systems.

A "run" of a vehicle refers to an act of operating a vehicle and causing the vehicle to move about the real world. A run may occur in public, uncontrolled environments such as city or suburban streets, highways, or open roads. A run may also occur in a controlled environment such as a test track.

The term "object," when referring to an object that is detected by a vehicle perception system or simulated by a simulation system, is intended to encompass both stationary objects and moving (or potentially moving) actors, except where specifically stated otherwise by terms use of the term "actor" or "stationary object."

When used in the context of autonomous vehicle motion planning, the term "trajectory" refers to the plan that the vehicle's motion planning system will generate, and which the vehicle's motion control system will follow when controlling the vehicle's motion. A trajectory includes the vehicle's planned position and orientation at multiple points in time over a time horizon, as well as the vehicle's planned steering wheel angle and angle rate over the same time horizon. An autonomous vehicle's motion control system will consume the trajectory and send commands to the vehicle's steering controller, brake controller, throttle controller and/or other motion control subsystem to move the vehicle along a planned path.

An "electronic device" or a "computing device" refers to a device that includes a processor and memory. Each device may have its own processor and/or memory, or the processor and/or memory may be shared with other devices as in a virtual machine or container arrangement. The memory will contain or receive programming instructions that, when executed by the processor, cause the electronic device to perform one or more operations according to the programming instructions.

The terms "memory," "memory device," "computer-readable medium," "data store," "data storage facility" and the like each refer to a non-transitory device on which computer-readable data, programming instructions or both are stored. Except where specifically stated otherwise, the terms "memory," "memory device," "computer-readable medium," "data store," "data storage facility" and the like are intended to include single device embodiments, embodiments in which multiple memory devices together or collectively store a set of data or instructions, as well as individual sectors within such devices. A computer program product is a memory device with programming instructions stored on it.

The terms "processor" and "processing device" refer to a hardware component of an electronic device that is configured to execute programming instructions, such as a microprocessor or other logical circuit. A processor and memory may be elements of a microcontroller, custom configurable integrated circuit, programmable system-on-a-chip, or other electronic device that can be programmed to perform various functions. Except where specifically stated otherwise, the singular term "processor" or "processing device" is intended to include both single-processing device embodiments and embodiments in which multiple processing devices together or collectively perform a process.

The terms "controller", "primary controller", "complementary controller", and "platform" refer to an electronic device that is configured to execute commands to control one or more other devices or device components.

In this document, the terms "communication link" and "communication path" mean a wired or wireless path via which a first device sends communication signals to and/or receives communication signals from one or more other devices. Devices are "communicatively connected" if the devices are able to send and/or receive data via a communication link. "Electronic communication" refers to the transmission of data via one or more signals between two or more electronic devices, whether through a wired or wireless network, and whether directly or indirectly via one or more intermediary devices.

An "automated device monitoring system" is a set of hardware that is communicatively and/or electrically connected to various components (such as sensors) of an automated device to collect status or operational parameter values from those components. An automated device monitoring system may include or be connected to a data logging device that includes a data input (such as a wireless receiver) that is configured to receive device operation data directly or indirectly from the device's components. The monitoring system also may include a processor, a transmitter and a memory with programming instructions. A monitoring system may include a transmitter for transmitting commands and/or data to external electronic devices and/or remote servers. In various embodiments, a monitoring system may be embedded or integral with the automated device's other computing system components, or it may be a separate device that is in communication with one or more other local systems, such as, for example in the context of an autonomous vehicle, an on-board diagnostics system.

In this document, when relative terms of order such as "first" and "second" are used to modify a noun, such use is simply intended to distinguish one item from another, and is not intended to require a sequential order unless specifically stated.

In addition, terms of relative position such as "vertical" and "horizontal", or "front" and "rear", when used, are intended to be relative to each other and need not be absolute, and only refer to one possible position of the device associated with those terms depending on the device's orientation. When this document uses the terms "front," "rear," and "sides" to refer to an area of a vehicle, they refer to areas of vehicle with respect to the vehicle's default area of travel. For example, a "front" of an automobile is an area that is closer to the vehicle's headlamps than it is to the vehicle's tail lights, while the "rear" of an automobile is an area that is closer to the vehicle's tail lights than it is to the vehicle's headlamps. In addition, the terms "front" and "rear" are not necessarily limited to forward-facing or rear-facing areas but also include side areas that are closer to the front than the rear, or vice versa, respectively. "Sides" of a vehicle are intended to refer to side-facing sections that are between the foremost and rearmost portions of the vehicle.

The invention claimed is:

1. A method for operating an autonomous vehicle (AV), the method comprising, by a complementary controller:

receiving, from a primary controller, information comprising an active trajectory of an AV, the active trajectory being a path that the AV intends to follow for a planning horizon;
using the active trajectory to identify one or more regions in an environment of the AV, the one or more regions comprising the following: a fallback monitoring region (FMR) and an active monitoring region (AMR);
generating one or more instructions for causing the AV to execute a collision mitigation action in response to an object being detected within the AMR; and
transmitting the one or more instructions to an AV platform (AVP) for execution,
wherein the FMR corresponds to a first length from a first current position of the AV to a first stopping point and the first stopping point is a point on the active trajectory that is reached by the AV at a first allowed deceleration rate when the collision mitigation action is executed;
wherein the AMR corresponds to a second length from a second current position of the AV to a second stopping point and the second stopping point is a point on the active trajectory that is reached by the AV at a second allowed deceleration rate when the collision mitigation action is executed; and
wherein the first length is greater than the second length.

2. The method of claim 1, further comprising, by a primary controller:
receiving a first set of sensor data from a primary sensor system and a second set of sensor data from a secondary sensor system;
generating, based on the first set of sensor data and the second set of sensor data, the active trajectory; and
transmitting, to the complementary controller, primary navigation instructions for navigating the AV along the active trajectory for transmission to the AVP.

3. The method of claim 2, further comprising, by the complementary controller:
receiving, from the primary controller, the primary navigation instructions for transmission to the AVP; and
while transmitting the one or more instructions to the AVP, stopping transmission of the received primary navigation instructions to the AVP.

4. The method of claim 2, further comprising, by the complementary controller, generating the one or more instructions for causing the AV to execute the collision mitigation action when the primary navigation instructions include a deceleration instruction that is greater than a maximum allowed deceleration.

5. The method of claim 1, further comprising, by the complementary controller generating the one or more instructions only in response to a risk of collision between the object and the AV being greater than a threshold.

6. The method of claim 5, wherein the risk of collisions is determined to be greater than the threshold based on at least one of the following: a state of the object; a state of the AV; environmental conditions; sensing pipeline performance; or detection pipeline performance.

7. The method of claim 1, further comprising, by the complementary controller, in response to a second object being present within an area of the FMR that does not include the AMR, generating the one or more instructions for causing the AV to execute the collision mitigation action only if an instruction for executing a minimum risk collision (MRC) state has been received by the complementary controller.

8. The method of claim 7, wherein the instruction for executing the MRC state is received from a primary controller upon detection of an error in one or more functions of the primary controller.

9. The method of claim 1, further comprising, by the complementary controller, stopping transmission of the one or more instructions to the AVP in response to determining an error within the complementary controller, the error comprising at least one of the following: a pose determination error; a sensor error; a sensor communication error; a primary controller communication error; or a perception error.

10. The method of claim 1, wherein the second allowed deceleration rate is greater than the first allowed deceleration rate.

11. A system for operating an autonomous vehicle (AV), the system comprising: an AV comprising:
a secondary sensor system,
a primary controller, and
a complementary controller, the complementary controller being configured to:
receive, from the primary controller, information comprising an active trajectory of the AV, the active trajectory being a path that the AV intends to follow for a planning horizon;
use the active trajectory to identify one or more regions in an environment of the AV, the one or more regions comprising the following: a fallback monitoring region (FMR) and an active monitoring region (AMR);
generate one or more instructions for causing the AV to execute a collision mitigation action in response to an object being detected within the AMR; and
transmit the one or more instructions to an AV platform (AVP) for execution,
wherein the FMR corresponds to a first length from a first current position of the AV to a first stopping point and the first stopping point is a point on the active trajectory that is reached by the AV at a first allowed deceleration rate when the collision mitigation action is executed;
wherein the AMR corresponds to a second length from a second current position of the AV to a second stopping point and the second stopping point is a point on the active trajectory that is reached by the AV at a second allowed deceleration rate when the collision mitigation action is executed; and
wherein the first length is greater than the second length.

12. The system of claim 11, wherein the primary controller is configured to:
receive a first set of sensor data from a primary sensor system and a second set of sensor data from the secondary sensor system;
generate, based on the first set of sensor data and the second set of sensor data, the active trajectory; and
transmit, to the complementary controller, primary navigation instructions for navigating the AV along the active trajectory for transmission to the AVP.

13. The system of claim 11, wherein the second allowed deceleration rate is greater than the first allowed deceleration rate.

14. A computer program product comprising a memory and programming instructions that are configured to cause a processor to:
receive, from a primary controller, information comprising an active trajectory of an autonomous vehicle (AV), the active trajectory being a path that the AV intends to follow for a planning horizon;

use the active trajectory to identify one or more regions in an environment of the AV, the one or more regions comprising the following: a fallback monitoring region (FMR) and an active monitoring region (AMR);

generate one or more instructions for causing the AV to execute a collision mitigation action in response to an object being detected within the AMR; and transmit the one or more instructions to an AV platform (AVP) for execution, wherein the FMR corresponds to a first length from a first current position of the AV to a first stopping point and the first stopping point is a point on the active trajectory that is reached by the AV at a first allowed deceleration rate when the collision mitigation action is executed;

wherein the AMR corresponds to a second length from a second current position of the AV to a second stopping point and the second stopping point is a point on the active trajectory that is reached by the AV at a second allowed deceleration rate when the collision mitigation action is executed; and wherein the first length is greater than the second length.

15. The computer program product of claim 14, further comprising programming instructions that when executed by the processor cause the processor to generate the one or more instructions only in response to a risk of collision between the object and the AV being greater than a threshold.

16. The computer program product of claim 14, wherein the second allowed deceleration rate is greater than the first allowed deceleration rate.

* * * * *